US012260250B2

United States Patent
Cameron et al.

(10) Patent No.: US 12,260,250 B2
(45) Date of Patent: *Mar. 25, 2025

(54) SYSTEM AND METHOD FOR EXECUTING MULTIPLE SCRIPTS AT A SINGLE EXTENSION POINT

(71) Applicant: SHOPIFY INC., Ottawa (CA)

(72) Inventors: David Cameron, Kitchener (CA); Jonathan Mitchell Dickinson, Kitchener (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,037

(22) Filed: Oct. 3, 2023

(65) Prior Publication Data

US 2024/0028393 A1    Jan. 25, 2024

Related U.S. Application Data

(63) Continuation of application No. 17/244,086, filed on Apr. 29, 2021, now Pat. No. 11,809,904.

(51) Int. Cl.
*G06F 9/48* (2006.01)
(52) U.S. Cl.
CPC .................. *G06F 9/4881* (2013.01)
(58) Field of Classification Search
None
See application file for complete search history.

(56) References Cited

U.S. PATENT DOCUMENTS

| | | | | |
|---|---|---|---|---|
| 1,151,384 A | * | 8/1915 | Owen | D01H 13/04 57/360 |
| 8,291,490 B1 | * | 10/2012 | Ahmed | G06F 21/604 726/20 |
| 8,374,894 B2 | * | 2/2013 | Weinstock | G06Q 30/02 705/5 |
| 8,543,508 B2 | * | 9/2013 | Katzin | G06Q 20/027 705/44 |
| 8,818,975 B2 | * | 8/2014 | Aigner | G06F 16/252 707/754 |
| 8,868,751 B2 | * | 10/2014 | Kylau | G06F 9/54 709/221 |
| 9,135,311 B2 | * | 9/2015 | Decker | G06F 16/252 |
| 9,442,700 B2 | * | 9/2016 | Sarid | G06F 9/547 |
| 9,455,876 B1 | * | 9/2016 | Grebenschikov | H04L 41/20 |
| 9,531,745 B1 | * | 12/2016 | Sharma | G06F 40/205 |

(Continued)

*Primary Examiner* — Van H Nguyen

(57) ABSTRACT

Systems and methods of executing multiple scripts at an extension point are provided. If there are multiple scripts that are associated with an extension point for a service instance in a SAAS platform, a script execution schedule is determined. This can indicate the order of execution of the multiple scripts, but may also specify how the inputs and outputs of the multiple script executions are obtained. For example, the inputs for multiple scripts can be the same, and be those provided by the SAAS platform at the extension point. In this case, in effect the multiple scripts are executed independently. Alternatively, the output of one script can function as the input to another script, which requires a certain order of execution. After all of the scripts are executed, output rules are used to determine an overall output of the script execution to be returned the platform through the extension point.

21 Claims, 4 Drawing Sheets

(56) References Cited

U.S. PATENT DOCUMENTS

| | | | |
|---|---|---|---|
| 9,582,598 B2* | 2/2017 | Kalgi | G06Q 20/227 |
| 9,674,168 B2* | 6/2017 | Kottahachchi | H04L 63/08 |
| 9,733,921 B1* | 8/2017 | Saenz | G06F 11/3672 |
| 9,753,701 B2* | 9/2017 | Liu | G06F 8/34 |
| 9,825,964 B2 | 11/2017 | Mellor et al. | |
| 10,057,140 B2* | 8/2018 | Fulton | H04L 41/5061 |
| 10,296,321 B2* | 5/2019 | Liu | G06F 8/65 |
| 10,417,690 B2* | 9/2019 | Mueller | G06Q 30/0635 |
| 10,606,582 B2* | 3/2020 | Yehuda | G06F 9/44526 |
| 10,659,542 B2* | 5/2020 | Ignatyev | H04L 43/0876 |
| 10,768,953 B2* | 9/2020 | Dobson | G06V 30/416 |
| 10,789,048 B2* | 9/2020 | Kismartoni | G06F 8/30 |
| 10,819,861 B2* | 10/2020 | Leemet | H04M 15/58 |
| 10,951,606 B1* | 3/2021 | Shahidzadeh | H04L 63/107 |
| 11,004,071 B2* | 5/2021 | Kruse | H04L 9/30 |
| 11,042,953 B1* | 6/2021 | Delgado | G06T 7/001 |
| 11,176,153 B2* | 11/2021 | Carvalho | G06F 16/252 |
| 11,237,814 B2* | 2/2022 | Lindholm | H04L 67/34 |
| 11,316,954 B2* | 4/2022 | Cameron | H04L 67/01 |
| 11,341,443 B2* | 5/2022 | Chu | G06F 9/4881 |
| 11,425,070 B2* | 8/2022 | Young | G06Q 10/0833 |
| 11,449,815 B2* | 9/2022 | Shakhnovich | G06Q 10/0633 |
| 11,494,825 B2* | 11/2022 | Wall | G06Q 30/0633 |
| 11,513,842 B2 | 11/2022 | Wang et al. | |
| 11,586,685 B2* | 2/2023 | Feijoo | G06F 16/951 |
| 11,809,904 B2* | 11/2023 | Cameron | G06F 9/4881 |
| 2012/0197811 A1* | 8/2012 | Kearney | G06Q 30/016 |
| | | | 705/304 |
| 2013/0159892 A1* | 6/2013 | Suraj | G06F 3/048 |
| | | | 715/762 |
| 2013/0290141 A1* | 10/2013 | Bhaskar | G06Q 30/0603 |
| | | | 705/26.61 |
| 2014/0278722 A1* | 9/2014 | Duerr | G06Q 30/0222 |
| | | | 705/7.26 |
| 2016/0117650 A1* | 4/2016 | Weidenmiller | G06Q 20/405 |
| | | | 705/44 |
| 2017/0060650 A1* | 3/2017 | Anderson | G06F 9/547 |
| 2018/0047018 A1* | 2/2018 | De Ganon | G06Q 20/401 |
| 2019/0056926 A1 | 2/2019 | Lindholm et al. | |
| 2019/0287314 A1* | 9/2019 | Rojo | G07B 17/00314 |
| 2020/0126105 A1* | 4/2020 | Joglekar | G06Q 30/0222 |
| 2020/0242590 A1* | 7/2020 | Sarjaz | H04L 63/0807 |

* cited by examiner

FIG. 4

SYSTEM AND METHOD FOR EXECUTING MULTIPLE SCRIPTS AT A SINGLE EXTENSION POINT

CROSS REFERENCE TO RELATED APPLICATIONS

This application is a continuation of U.S. patent application Ser. No. 17/244,086 entitled "System and Method for Executing Multiple Scripts at a Single Extension Point", which was filed Apr. 29, 2021 (now U.S. Pat. No. 11,809,904), the contents of which are incorporated herein by reference.

FIELD

The application relates software platforms that are extensible through the use of extension points, and to the execution of scripts through such extension points.

BACKGROUND

Extension points are particular places within a platform's executable code that have been made extensible for third party developers, via writing scripts that adhere to the interface (i.e. described inputs/outputs) of that extension point, to allow for additional logic or functionality to be inserted into the platform's execution. These scripts are typically hosted on the platform's infrastructure, making these scripts a performant way to customize the functionality of the platform's core product.

Users of the platform (i.e. service instance owners, e.g. merchants) are able to write their own scripts and register them at their relevant extension points for execution. Alternatively, scripts can be developed and registered by a third-party app developer, such that any merchant installing that developer's app on their service instance will include all of the app's Scripts (at all of the relevant extension points) during execution.

SUMMARY

Systems and methods of executing multiple scripts at an extension point are provided. In a situation where there are multiple scripts that are associated with an extension point for a service instance in a SAAS platform, a script execution schedule is determined. This can indicate the order of execution of the multiple scripts, but may also specify how the inputs and outputs of the multiple script executions are obtained. For example, the inputs for multiple scripts can be the same, and be those provided by the SAAS platform at the extension point. In this case, in effect the multiple scripts are executed independently. Alternatively, the output of one script can function as the input to another script, which requires a certain order of execution. After all of the scripts are executed, output rules are used to determine an overall output of the script execution to be returned to the platform through the extension point.

According to one aspect of the present invention, there is provided a computer-implemented method comprising: executing computer executable code to provide a service instance in a SAAS platform, the computer executable code including an extension point; determining a script execution schedule for executing multiple scripts to be executed for the extension point; during execution of said computer executable code for the service instance, responsive to reaching the extension point, executing the multiple scripts in accordance with the script execution schedule, wherein the executing the multiple scripts results in a respective output for each of the multiple scripts; and applying an output rule to determine an overall output of executing the multiple scripts, wherein the overall output is a function of at least one of the respective outputs, and returning the overall output to the service instance through the extension point.

Optionally, determining the script execution schedule comprises performing an automated analysis of the scripts.

Optionally, the overall output is a selected one of the respective outputs.

Optionally, the overall output is a function of two or more of the respective outputs.

Optionally, each script is run independently based on an input from the extension point.

Optionally, the scripts are executed in a specific order, the specific order including a last script to be executed; and the overall output is the respective output of the last script to be executed.

According to another aspect of the present invention, there is provided an apparatus comprising: a processor and a memory, the apparatus configured to execute a method comprising: executing computer executable code to provide a service instance in a SAAS platform, the computer executable code including an extension point; determining a script execution schedule for executing multiple scripts to be executed for the extension point; during execution of said computer executable code for the service instance, responsive to reaching the extension point, executing the multiple scripts in accordance with the script execution schedule, wherein the executing the multiple scripts results in a respective output for each of the multiple scripts; and applying an output rule to determine an overall output of executing the multiple scripts, wherein the overall output is a function of at least one of the respective outputs, and returning the overall output to the service instance through the extension point.

Optionally, the apparatus further comprises determining the script execution schedule by performing an automated analysis of the scripts.

Optionally, the overall output is a selected one of the respective outputs.

Optionally, the overall output is a function of two or more of the respective outputs.

Optionally, each script is run independently based on an input from the extension point.

Optionally, the scripts are executed in a specific order, the specific order including a last script to be executed; and the overall output is the respective output of the last script to be executed.

According to another aspect of the present invention, there is provided a computer-readable medium having instructions stored thereon that, when executed by a computer, cause the computer to perform a method comprising: executing computer executable code to provide a service instance in a SAAS platform, the computer executable code including an extension point; determining a script execution schedule for executing multiple scripts to be executed for the extension point; during execution of said computer executable code for the service instance, responsive to reaching the extension point, executing the multiple scripts in accordance with the script execution schedule, wherein the executing the multiple scripts results in a respective output for each of the multiple scripts; and applying an output rule to determine an overall output of executing the multiple scripts, wherein the overall output is a function of at least one of the respective outputs, and returning the overall output to the service instance through the extension point.

BRIEF DESCRIPTION OF THE DRAWINGS

Embodiments of the disclosure will now be described with reference to the attached drawings.

FIG. 4 is an example of a home page of a merchant, according to one embodiment.

DETAILED DESCRIPTION

There may be situations where multiple apps can register scripts for the same extension point, and thus a platform user can install multiple apps on their service instance that have each registered a script for the same extension point. For example, a Cash-on-Delivery (CoD) app runs on a payment extension point of a checkout function to overwrite the list of payment options with a single payment option named "Cash on Delivery", but another payment-related app may run on the same payment extension point that allows the merchant to configure a specific ordering of payment options (e.g. always list PayPal first) for any non-CoD purchases. More generally there may be situations where there are multiple scripts for an extension point.

It is unclear how the multiple scripts at a single extension point should be executed—in what order, and/or with what logic for combining and/or overwriting values if multiple different values for a given output are produced by the various scripts. Without a systematic approach to executing multiple scripts at a single extension point, system behaviour may be unpredictable or unstable, and undesired results may be produced.

A framework for scheduling execution of multiple scripts registered at an extension point is provided. The script execution schedule is determined for executing the multiple scripts. These can be determined based on rules that are hard coded within the system, and/or rules that are configurable. The script execution schedule may also take into account input provided by the platform provider, or by platform users, for example merchants in the case of an e-commerce platform. The framework includes tools for creating and registering scripts, the for determining the script execution schedule, and for using an output rule for defining how an overall output rule is produced based on the execution of multiple scripts. While much of the following detailed discussion refers to an extension point having a single input and a single output, it should be understood that an extension point may have multiple inputs and/or multiple outputs. One or more of the inputs may be reproduced as corresponding output(s) of script execution after possible modification.

In some embodiments, one or more extension points are defined and published. The extension point has a defined input and an output. Scripts can be registered against an extension point. Scripts may be provided by platform developers or third party developers for execution on the platform core or on $3^{rd}$ party infrastructure.

Figure 1:
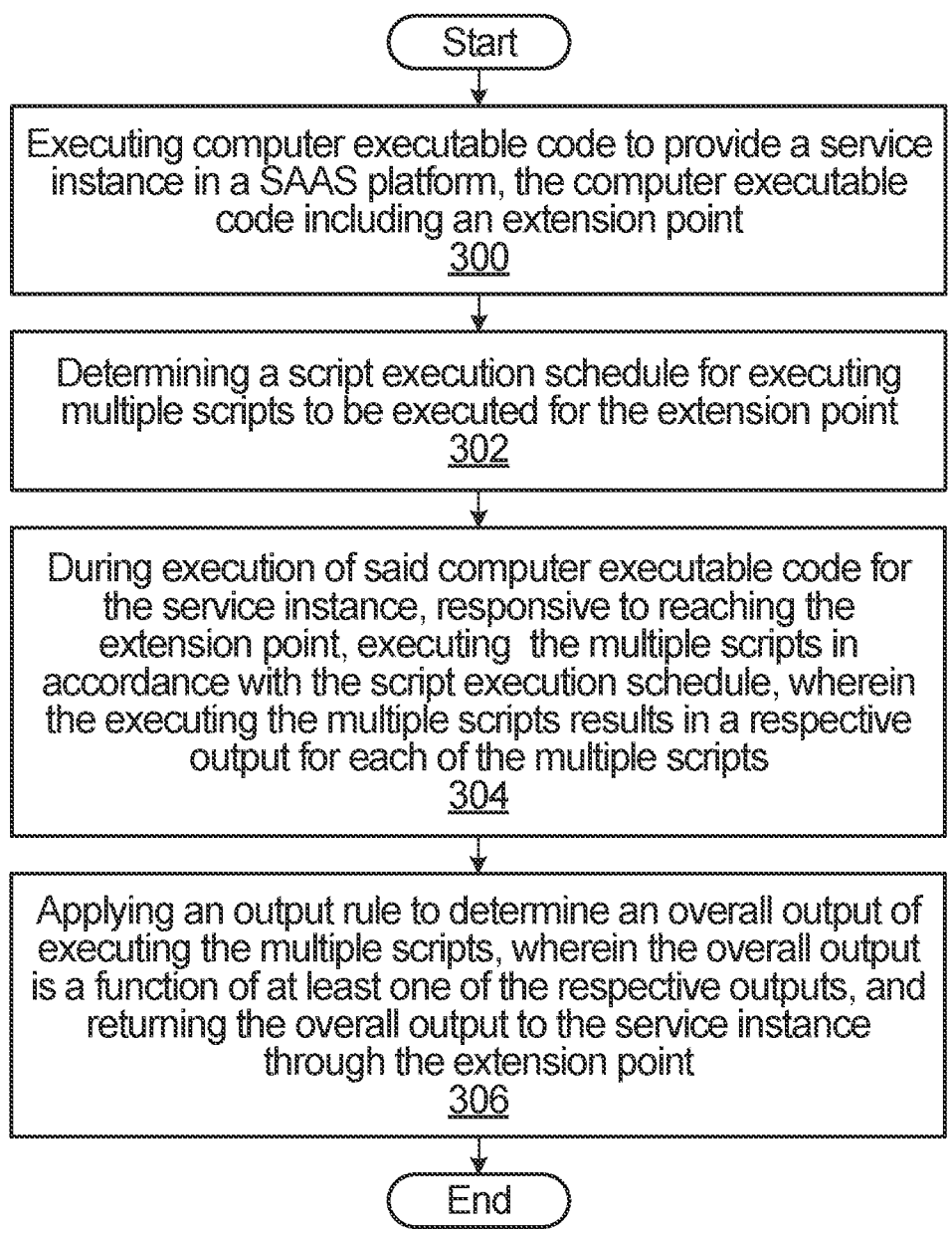
FIG. 1 is a flowchart of a method of executing multiple scripts at an extension point.

With reference to FIG. 1, shown is a flowchart of a computer-implemented method in a software platform providing core functionality, for combining multiple scripts at a single extension point.

The method begins at block 300 with executing computer executable code to provide a service instance in a SAAS platform, the computer executable code including an extension point. In a specific example, the SAAS platform may be a commerce platform, and the service instance may be a shop of a merchant.

Block 302 involves determining a script execution schedule for executing multiple scripts to be executed for the extension point. The determination of the script execution schedule may be performed based on scheduling parameters which can be extension point specific and/or service instance (e.g. merchant/shop) specific. Scheduling parameters broadly encompasses any input to the determination of the script execution schedule. These can be values, scheduling rules, indexes to scheduling rules to name a few examples. Examples of scheduling parameters include:

1) enable/disable parameter for each script; this may be service instance specific. When this parameter is included, only scripts that are enabled for a given service instance are scheduled for execution.
2) sequence of execution—an explicit indication of the order of execution of multiple scripts for an extension point
3) one or more parameters indicating interdependency of execution:
   A) independent—when execution of the multiple scripts is independent, all scripts receive the same input and produce a respective output. In this case the scheduler is free to set the order of execution, which can be in parallel or in serial, as the order has no effect on the outputs.
   B) dependent—broadly, dependent execution covers situations where the execution of one of the multiple scripts has an effect on the execution of another of the multiple scripts.
   C) more complicated interdependency that may allow some independence, some dependent, and optionally some conditions that set execution path.

The following is a simple example of independent execution:
   i) script A executes using an input <input> to produce an output <output_1>;
   ii) script B executes using the same input <input> to produce an output <output_2>;

The following is a simple example of dependent execution:
   i) script A executes using an input <input> to produce an output <output_1> which is a modified version of the input;
   ii) script B executes using the modified version of the input produced by script A (i.e. input to script B=<output_1> to produce an output <output_2>.

In the dependent execution example, script A must be executed first, and the output of script A used as an input to script B.

More generally, where there is a set of multiple scripts (at least two), dependent execution will indicate whether the input to each script is the original input from the platform, or an output of another script, and this will also implicitly indicate an order of execution. Alternatively, dependent execution can explicitly indicate the order of execution, and in addition, for each script, whether the input should be the original input from the platform, or an output of a previously executed script. With this latter approach, a combination of dependent and independent is possible. In this case, one or more independent scripts may execute at any time using the original input from the platform, and other scripts are executed in a specific order, for example with a first script operating on the input from the platform, and a second script operating with the output of the first script, In some embodiments, determining the script execution schedule involves performing an automated analysis of the scripts.

In some embodiments, this involves determining scheduling parameters and/or the output rule in an automated manner. The system determines the scheduling parameters and/or the output rule after analyzing the scripts. For example, past orders may be pre-compiled to ascertain what ordering would achieve the most favorable outcome for the buyers based on historical data. Rather than computing the ordering on the fly (in a low-latency environment), the method relies on a pre-processed order which achieves similar outcomes.

In some embodiments, this can involve analyzing the scripts per se. The scripts can be analyzed to determine to what degree they are independent of other scripts. For example, while every script has the same set of input variables and the same set of output variables, a given script may not have an effect on every one of the outputs. Two scripts that affect non-overlapping subsets of outputs can be considered independent.

For some extension points, one or more of the input variables may be reproduced as an output variable. In such a situation, a given script may or may not modify a given input variable. If a given input variable is not modified by a script, the value of the input variable is reproduced for the corresponding output variable. On the other hand, a given input variable is modified by a script, then the value of the corresponding output variable will be the modified value.

For a given extension point, the input variables and output variables can be compared to determine if any input variables are reproduced as corresponding output variables. Each script can then be analyzed to see if the script actually modifies such input variables.

In some embodiments, this involves analyzing tags associated with a script that indicate script attributes.

A first example of a tag is one that indicates whether or not a script mutates a given input. This would be useful in a case where an extension point includes one or more outputs that are the same as the inputs. For example, an input to a script might include a "total discount" field, and the output of the script also includes an updated "total discount" field. However, some scripts for an extension point may modify the field while others do not. If a script does not modify an input in this manner, then there is more flexibility in scheduling execution of that script.

Another example of a tag that might be input to automated scheduling is one that indicates whether or not the script produces any side effects. A side effect of a script is an observable effect besides returning the expected outputs through the extension point (the main effect).

In some embodiments, the script execution schedule, or some or all of a set of scheduling parameters input to determining a script execution schedule, is/are determined in an automated fashion based on one or more default rules applied without analyzing the scripts.

In some embodiments, the script execution schedule, or some or all of the scheduling parameters input to determining the script execution schedule, is/are determined based on input from a user (e.g. merchant) through a user interface. In this case a user will have some control over how multiple scripts are executed for their particular service instance.

In some embodiments, the script execution schedule, or some or all of the scheduling parameters input to determining the script execution schedule, is/are determined based on rules that are configured/configurable by platform provider.

In some embodiments some or all of the scheduling parameters are hard coded.

Returning to FIG. 1, in block 304, during execution of the computer executable code for the service instance, responsive to reaching the extension point, the multiple scripts are executed in accordance with the script execution schedule. Executing the multiple scripts results in a respective output for each of the multiple scripts.

Execution examples are given above in the discussion of the output rules. The script execution schedule and output rule may be determined each time the extension point is encountered, to allow for the possibility that the scheduling parameters and/or output rule may have changed. Alternatively, the script execution schedule and/or the output rule can be updated in the background any time the scheduling parameters are changed.

In block 306, an output rule is applied to determine an overall output of executing the multiple scripts. The overall output is a function of at least one of the respective outputs. The overall output is returned to the service instance through the extension point. The platform can then act on these results accordingly.

The output rule sets how the output from each of the multiple scripts is used in generating a single output at the extension point that will be returned to the platform. The output rule options available in a given situation may depend on how the scripts are executed/scheduled.

For independent execution, a possible output rule involves selecting between the outputs based on a rule. For example, for a set of N scripts operating on the original input, there are N outputs determined as follow:

$$\text{Output}_i = \text{script}_i(\text{original input}), i=1, \ldots, N.$$

The overall output is selected from these outputs according to:

$$\text{Output} = \text{select}(\text{output}_1, \ldots, \text{Output}_N)$$

where "select" is a specific rule for selecting between the outputs.

The following is an example pertaining to discounts applied in a commerce platform that involves independent execution followed by output selection:
- each script computes a respective discount using the original input to produce a respective output (respective discount);
- a select rule is used to select the largest discount;
- the largest discount is returned to the platform.

In this case, where multiple discounts are available, a customer can only have the benefit of one, and the system selects the largest one For independent execution, another possible output rule involves producing an output that is a function of all of the outputs of the individual scripts. In this case:

$$\text{Output}_i = \text{script}_i(\text{original input}), i=1, \ldots, N.$$

$$\text{Output} = f(\text{output}_1, \ldots, \text{Output}_N)$$

where "f" is a specific function for combining the multiple outputs.

The following is another discount example that involves independent execution followed by producing an overall output that is a function for combining multiple outputs:
- each script computes a respective discount based on the original input;

"f" is a function that adds the discount amounts to produce a total discount;

the total of the discounts is returned to the platform.

For dependent execution, an example of an output rule is one that simply uses the output of the last script to be executed as the overall output.

The script execution schedule may involve executing the scripts in a specific order, the specific order including a last script to be executed, with the overall output being set to the output of the last script to be executed.

The following is an example of discount computation using two scripts with dependent execution in a specific order, where the overall output is the output of the last script to be executed:

A first script implements a buy one get one free discount (buy one get one free script). The input is the current cart, including a cart total, and an input discount amount (zero for the first script). The output is updated cart with updated cart total and updated discount amount. The script processes the cart to see if there are two items that satisfy the buy one get one free criteria, and if so applies a discount equal to the lesser valued item of the two items.

A second script implements a discount on cart total if the cart total is >eligibility amount (car total script). The input is the current cart, including a cart total, and an input discount amount. The output is updated cart with updated cart total and updated discount amount.

The dependent execution rule in this example requires the buy one get one free script to be applied first. This produces a discount total that is the value of the free item.

Then, the cart total script is executed using the cart total produced by the buy one get one free discount rule. If the cart total including the buy one get one free discount is >the eligibility amount, then a further discount is computed based on the cart total. This is added to the buy one get one free discount, and the total discount is returned. The cart total is also adjusted. If the cart total including the buy one get one free discount is <the eligibility amount, then the cart total script produces a further discount of zero, and the overall output will be the same as the output of the buy one get one free script. So in this case, the overall output is simply the output of the last script to be executed, namely the cart total script.

In this example, whether or not the cart total discount is applied by the cart total script is dependent on the output of the buy one get one free script; in addition, the amount of the cart total discount is affected by the buy one get one free discount, since the amount used to calculate the cart total discount will be smaller after the buy one get one free discount has been applied.

Flow Example

Merchant A installs App X which registers Script $S_X$ at Extension Point P (payment options). $S_X$ orders the list of payment options presented to a buyer on the Checkout page by frequency of use by this buyer.

Merchant A installs App Y which registers Script $S_Y$ at Extension Point P (payment options). $S_Y$ adds "Cash on Delivery" as a payment option to the list of payment options presented to a buyer on the Checkout page.

A scheduling parameter for scheduling of Script $S_X$ and Script $S_Y$ indicates that Script $S_Y$ is to be scheduled first, which adds the COD as a payment option, and Script $S_X$ is to be scheduled second, which will present an ordered list of payment options including COD. A script execution schedule is determined taking into account this scheduling parameter which involves executing Script $S_Y$ followed by Script $S_X$. This script execution schedule may be determined in advance, or when the extension point is encountered during execution. An output rule indicates that the overall output is set to equal the output execution of Script $S_X$.

Buyer B visits the Checkout page of Merchant A's store which triggers Extension Point P to execute.

The system executes the scripts based on the determined script execution schedule and the output rule. The COD option is added and then payment options including COD are sorted. The sorted list thus produced is returned to the platform. Buyer B sees the sorted list of payment options in which Cash on Delivery is sorted correctly into the list of payment options.

Figure 3:
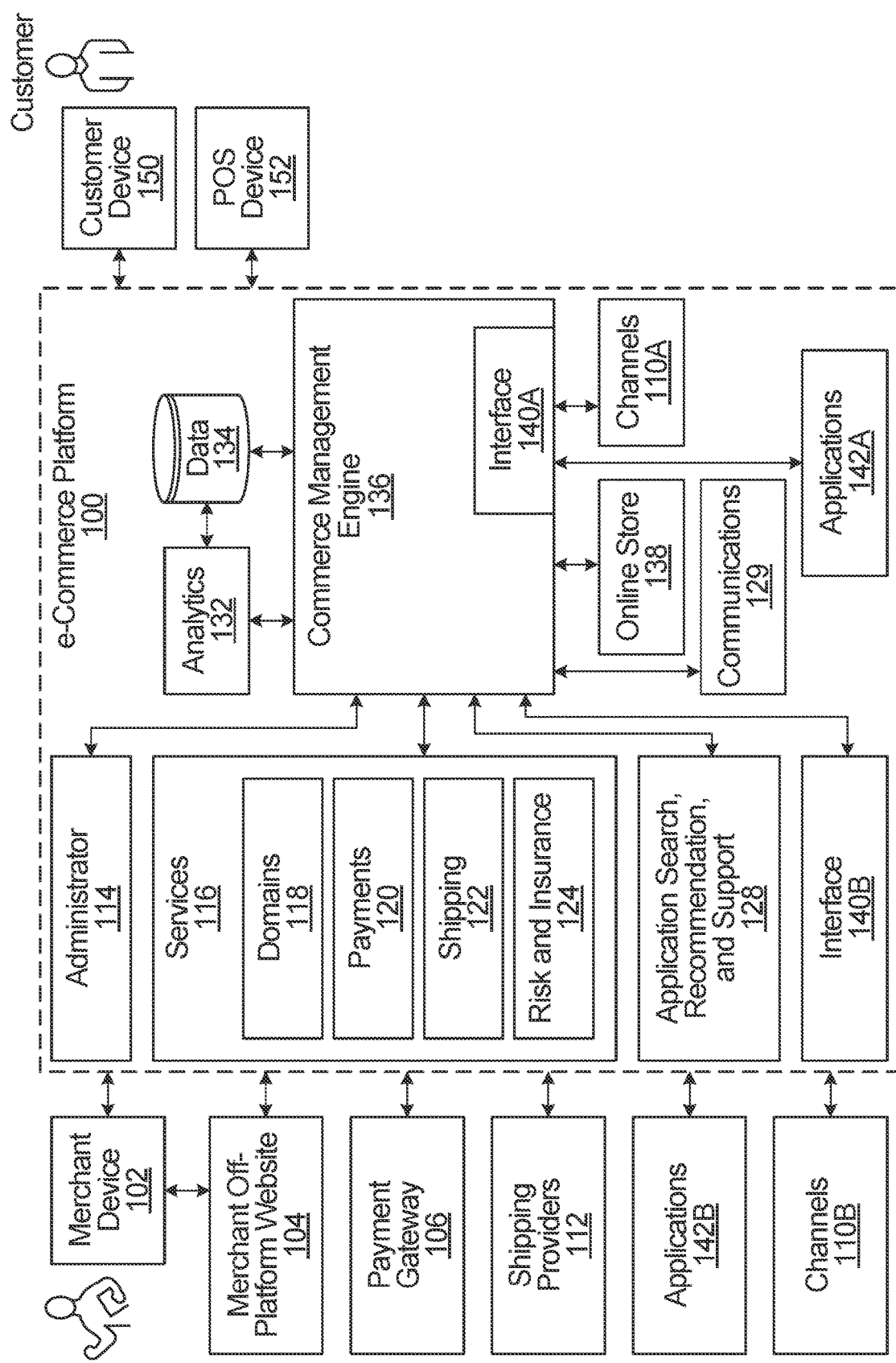
FIG. 3 is a block diagram of an e-commerce platform, according to one embodiment.

Referring to FIG. 3, shown is a SAAS platform 300 provided by an embodiment of the application. The SAAS platform is configured to implement service instances 302, a service instance being a set of functionality provided by the SAAS platform to a client of the SAAS platform. In a specific example, the SAAS platform is an E-commerce platform, and the service instances 302 are online stores implemented on the E-commerce platform. A detailed example of an embodiment of an E-commerce platform is described below with reference to FIGS. 3 and 4.

The executable code that implements the service instances 302 includes one or more extension points 303. Extension points 303 are defined inside the SAAS platform to allow the customization of functionality of the SAAS platform, and more specifically the service instances. Each extension point has a specified format that includes well defined inputs and outputs. Extension point examples have been described above. An extension point manager 305 is responsible for determining how to proceed once an extension point is reached during execution of code for a service instance. The extension point manager 305 has a script scheduler 330 that determines script execution schedules for storage in script execution schedule storage 332 as detailed below.

The SAAS platform 300 has applications functionality 304 associated with applications that may be registered with the SAAS platform. In the illustrated example, this includes an application registration interface 310 for registering an application with the SAAS platform. For example, third party application developers may use this interface to register their applications. There is an application register 312 which associates each registered application with an application ID. There is an application installation interface 314 that is used to select which registered applications are to be installed against a given service instance. In the E-commerce context, the application installation interface 314 may be part of a merchant user interface, in which case personnel associated with an online store can use the application installation interface 314 to select which applications to install. An application installations register 316 maintains an indication of which application(s) are installed on (or registered against) which service instance(s).

The SAAS platform 300 has scripts functionality 306 associated with scripts to be executed on the SAAS platform. In the illustrated example, this includes a script uploading interface 318 for uploading scripts. Each script is uploaded in association with a specific application that is registered in the application registration interface 310 and a specific extension point within extension points 303. Typically, the source of the script is the same as the source of the application, for example an application developer or provider. The scripts are stored in script storage 320 together with a script ID for each script. In addition, a script mapping 322 is maintained. The script mapping 322 indicates for each script, the associated application and the associated extension point. There are many ways equivalent information can be maintained. For example, for each extension point, script mapping could indicate which applications have scripts for the extension point, and indicate the script ID of such scripts. As described above, there can be multiple scripts that are associated with the same extension point The scripts functionality 306 also has a script executor 324 which executes the scripts in the script storage 320 in accordance with a script execution schedule produced by the script scheduler 330. The script scheduler 330 is responsible for scheduling script execution in situations where there are multiple scripts associated with an extension point for a given service instance. The script executor 324 is generally a processing capability within the SAAS platform. The script uploading interface 318 may also compile uploaded code received through the script uploading interface to produce the script in executable form for execution by the script executor 324.

In operation, service instances 302 are used to deliver SAAS services to clients. Typically, each service instance is associated with a respective client, although a client may be associated with or have multiple service instances. In the E-commerce context, a client would typically be a merchant.

Third party application developers develop applications for registration on the SAAS platform 300, and register these through the application registration interface 310. When this takes place the application register 312 is updated to indicate the application has been registered, and the application ID of the application. Once an application is registered with the platform, it is available for installation (or registration) against a service instance 302. Through the application installation interface 314, a client can select which registered application(s) to be installed against the client's service instance 302.

In addition, application developers, for example the third party application developers, may develop scripts to provide customized functionality in association with a specific application, and in association with one or more of the available extension points 303. Each script is developed in conformance with the format of the associated extension point. For example, the inputs to the script and outputs produced by the script should match those of the associated extension point.

These scripts are uploaded through the script uploading interface 318 which results in their storage in script storage 320 together with a script ID for each script. The script mapping 322 is updated to include a record for the script indicating the associated extension point(s) and the associated application ID. After multiple scripts have been associated with an extension point for a given service instance, the script scheduler 330 produces a script execution schedule for the extension point specific to that service instance and stores this in the script schedule storage 332. In addition, one or more output rules are identified and stored in the script execution schedule storage. These rules determine how the outputs of execution of the multiple scripts are to be combined to produce an overall output that is to be returned through the extension point. Different sets of scripts may be associated with the same extension point for different service instances, and as such the script execution schedule is produced on a per service instance basis. Alternatively, in another implementation, the same set of scripts are associated with an extension point for all service instances, in which case a common script execution schedule may be used for that extension point for all service instances.

During the execution of a service instance 302, for example while a merchant or customer accesses an online store, when one of the extension points 303 is reached, the extension point manager 305 obtains the script execution schedule for that extension point and that service instance from the script execution schedule storage 332, and instructs the script executor to execute the scripts associated with the extension point in accordance with the schedule. An overall output is determined based on the output rules.

Figure 2:
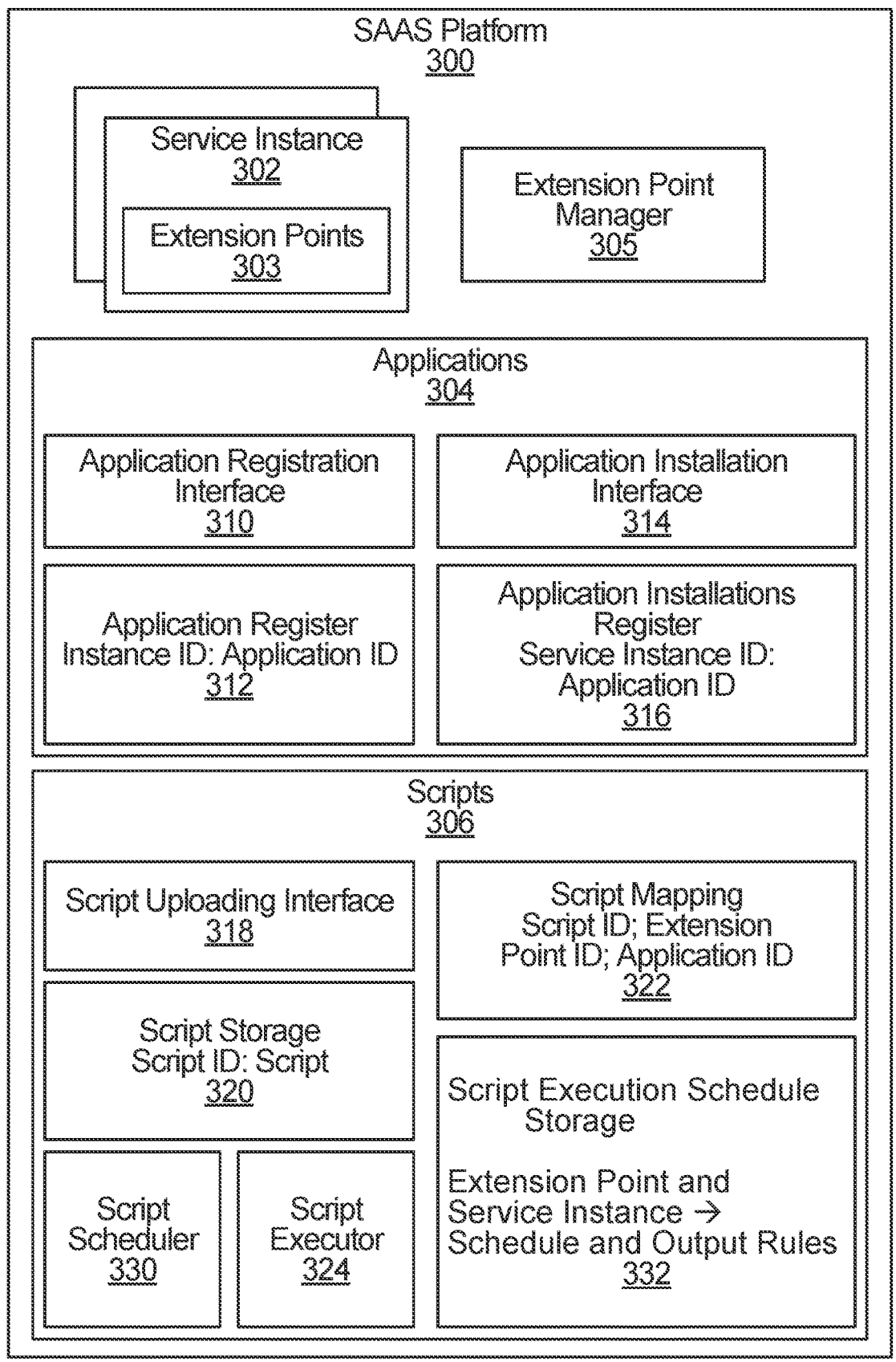
FIG. 2 is a block diagram of a software platform provided by an embodiment of the application.

In a specific implementation, the functional blocks of FIG. 2 are all implemented with a processor and a memory. The memory contains computer executable instructions that when executed implement the functional blocks. In some embodiments, the SAAS platform 300 is configured to implement the method of FIG. 1 described in detail above, optionally including any of the additional features described above.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 3 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

Figure 4:
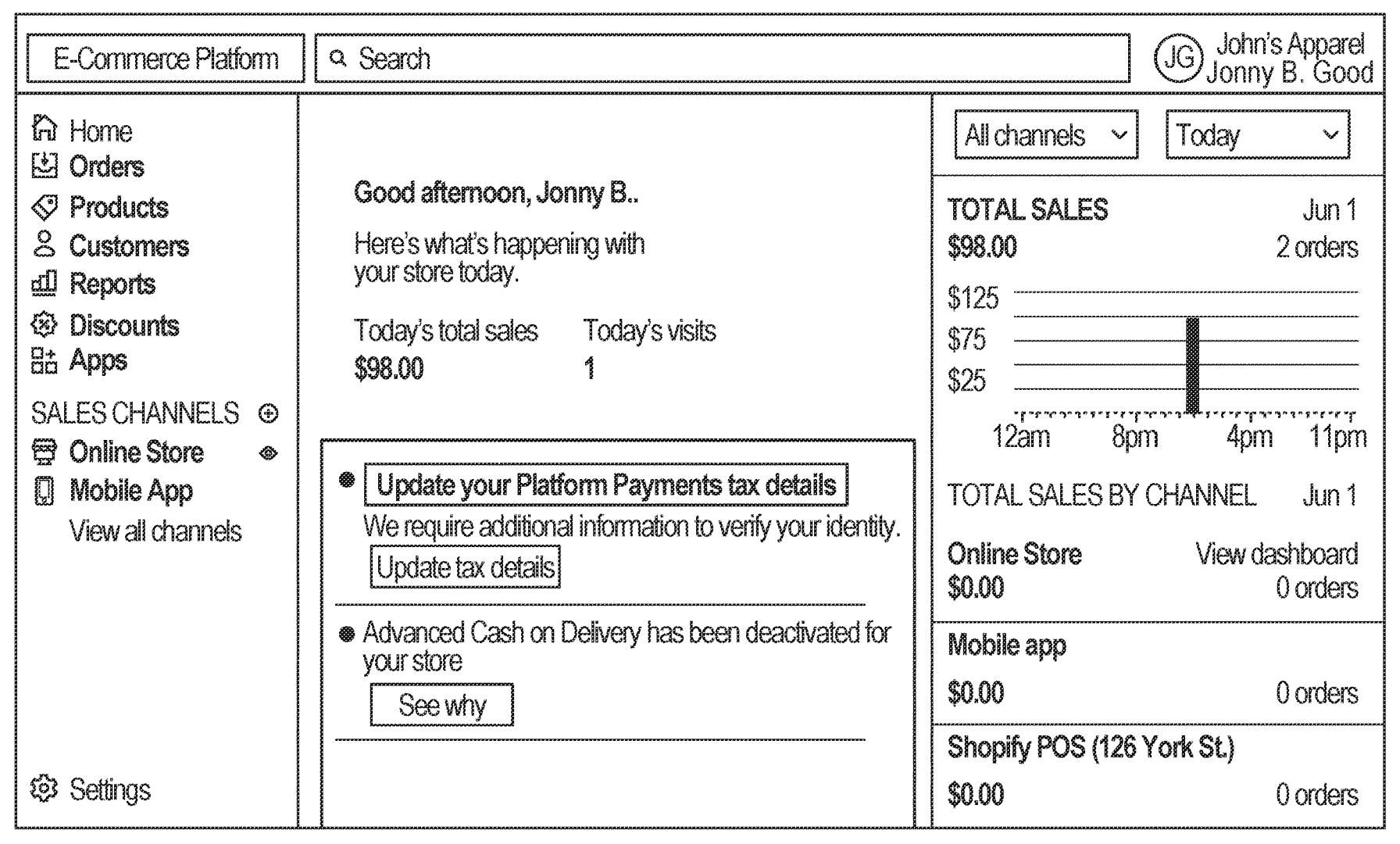

In the example of FIG. 4, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network 420 connected to the e-commerce platform 100. For example, the online store 138 may serve or send content in response to requests for data 134 from the customer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 4 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 3, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Numerous modifications and variations of the present disclosure are possible in light of the above teachings. It is therefore to be understood that within the scope of the appended claims, the disclosure may be practiced otherwise than as specifically described herein.

The invention claimed is:

1. A computer-implemented method comprising:
   executing computer executable code to provide a service instance in a software as a service (SAAS) platform, the computer executable code including an extension point;
   during the execution of said computer executable code for the service instance, responsive to reaching the extension point, executing multiple scripts associated with the extension point, wherein the executing the multiple scripts results in a respective output for each of the multiple scripts; and
   determining an overall output of executing the multiple scripts, wherein the overall output is a function of at least one of the respective outputs, and returning the overall output to the service instance through the extension point.

2. The method of claim 1, further comprising:
   determining a script execution schedule for executing multiple scripts to be executed for the extension point, wherein the multiple scripts are executed in accordance with the script execution schedule.

3. The method of claim 2 wherein determining the script execution schedule comprises performing an automated analysis of the scripts.

4. The method of claim 1 wherein the overall output is a selected one of the respective outputs.

5. The method of claim 1, wherein the overall output is a function of two or more of the respective outputs.

6. The method of claim 1, wherein each script is run independently based on an input from the extension point.

7. The method of claim 1, wherein the scripts are executed in a specific order, the specific order including a last script to be executed; and
   the overall output is the respective output of the last script to be executed.

8. A computer system comprising:
   at least one processor; and
   a memory, storing instructions that, when executed by at least one of the least one processor cause the computer system to:
   execute computer executable code to provide a service instance in a software as a service (SAAS) platform, the computer executable code including an extension point;

during the execution of said computer executable code for the service instance, responsive to reaching the extension point, execute multiple scripts associated with the extension point to result in a respective output for each of the multiple scripts; and determine an overall output of executing the multiple scripts, wherein the overall output is a function of at least one of the respective outputs, and returning the overall output to the service instance through the extension point.

9. The computer system of claim 8, wherein the instructions further cause the system to:

determine a script execution schedule for executing multiple scripts to be executed for the extension point, wherein the multiple scripts are executed in accordance with the script execution schedule.

10. The computer system of claim 9, wherein the instructions further cause the system to:

determine the script execution schedule by performing an automated analysis of the scripts.

11. The computer system of claim 8 wherein the overall output is a selected one of the respective outputs.

12. The computer system of claim 8, wherein the overall output is a function of two or more of the respective outputs.

13. The computer system of claim 8, wherein each script is run independently based on an input from the extension point.

14. The computer system of claim 8, wherein the scripts are executed in a specific order, the specific order including a last script to be executed; and the overall output is the respective output of the last script to be executed.

15. A non-transitory computer-readable medium having instructions stored thereon that, when executed by a computer, cause the computer to perform a method comprising:

executing computer executable code to provide a service instance in a software as a service (SAAS) platform, the computer executable code including an extension point;

during the execution of said computer executable code for the service instance, responsive to reaching the extension point, executing multiple scripts associated with the extension point, wherein the executing the multiple scripts results in a respective output for each of the multiple scripts; and determining an overall output of executing the multiple scripts, wherein the overall output is a function of at least one of the respective outputs, and returning the overall output to the service instance through the extension point.

16. The non-transitory computer readable medium of claim 15, the method further comprising:

determining a script execution schedule for executing multiple scripts to be executed for the extension point, wherein the multiple scripts are executed in accordance with the script execution schedule.

17. The non-transitory computer readable medium of claim 16, wherein determining the script execution schedule comprises performing an automated analysis of the scripts.

18. The non-transitory computer readable medium of claim 15 wherein the overall output is a selected one of the respective outputs.

19. The non-transitory computer readable medium of claim 15, wherein the overall output is a function of two or more of the respective outputs.

20. The non-transitory computer readable medium of claim 15, wherein each script is run independently based on an input from the extension point.

21. The non-transitory computer readable medium of claim 15, wherein the scripts are executed in a specific order, the specific order including a last script to be executed; and the overall output is the respective output of the last script to be executed.

* * * * *